United States Patent Office 3,102,314
Patented Sept. 3, 1963

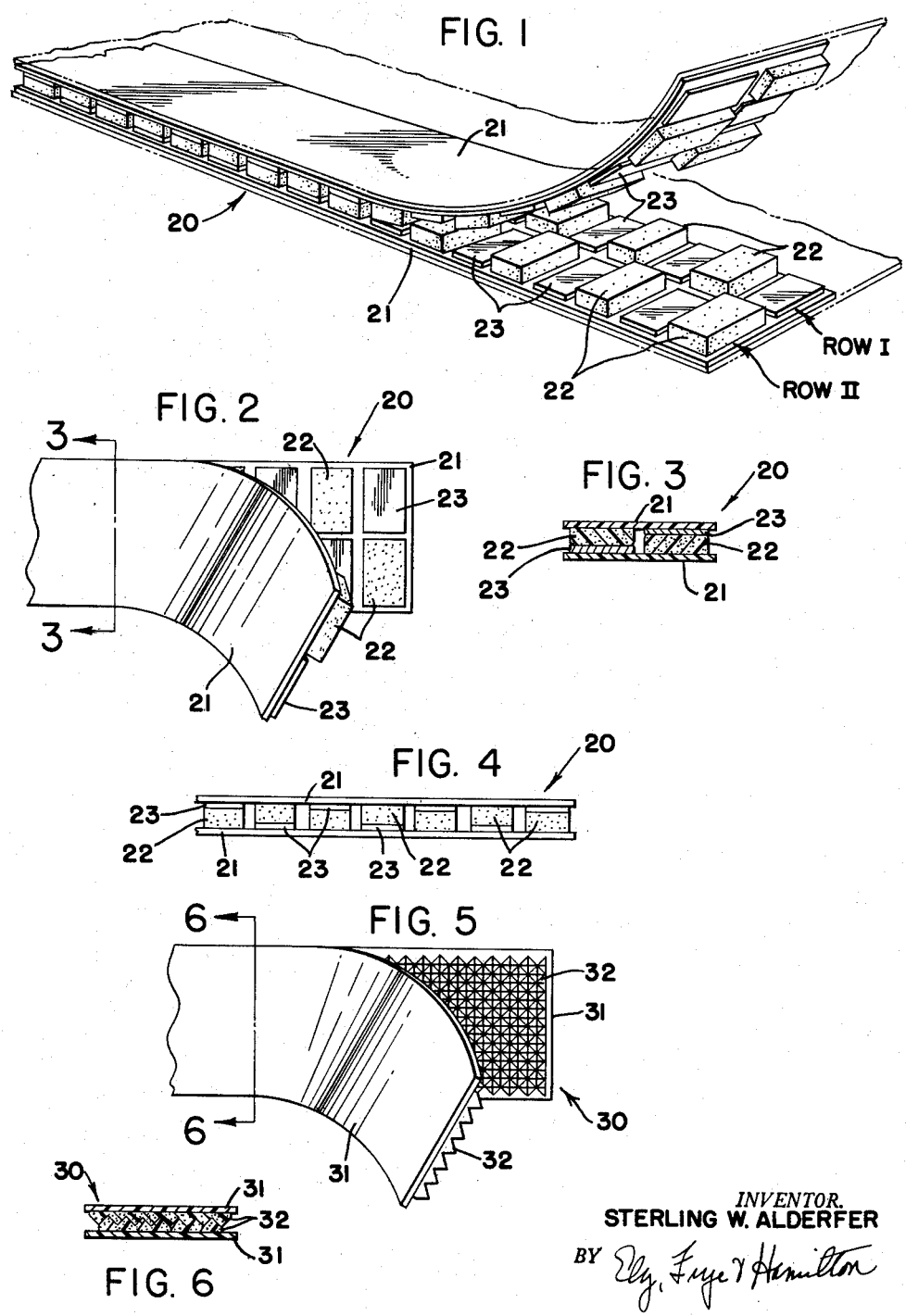

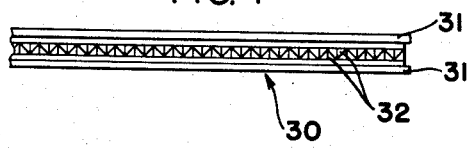
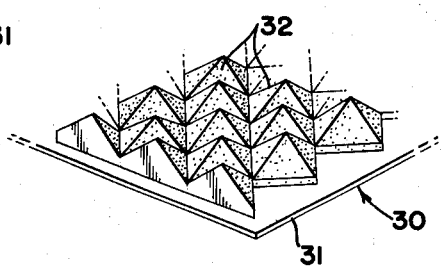
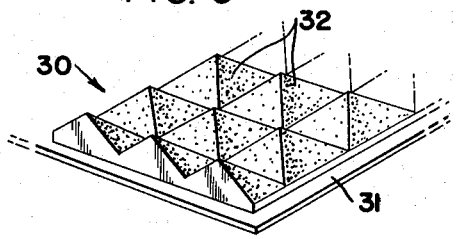
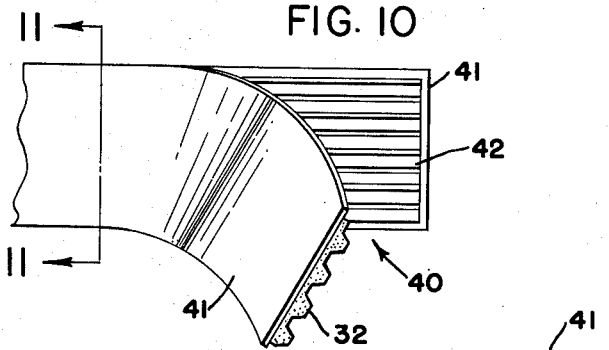
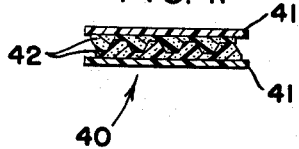
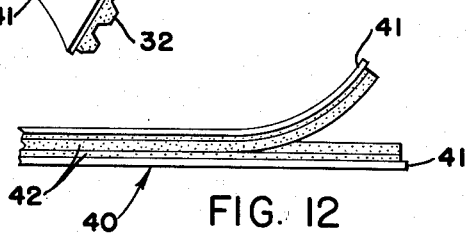

3,102,314
FASTENER FOR ADJACENT SURFACES
Sterling W. Alderfer, 464 N. Portage Path, Akron, Ohio
Filed Oct. 1, 1959, Ser. No. 843,764
4 Claims. (Cl. 24—204)

The present invention relates to improved materials for fastening or closing adjacent surfaces. More particularly, the invention relates to fasteners which may be made in any desired length and are attached to the individual surfaces in any suitable manner. Specifically, the invention relates to a fastener having complementary faced susfaces which are magnetically attracted to each other.

It is an object of the present invention to provide an imporved concept in fastener materials which will provide for the positive or secure closing of various surfaces under extremes of environmental condition such as high or low temperature, wet or dry climates, etc. It is a further object to provide fastener materials which do not require components or elements which could jam or corrode so as to become inoperative. These and still other objects of the invention, as well as advantages thereof, will be apparent in view of the following detailed description and the attached drawings.

In the drawings:

FIG. 1 is a perspective view of one form of a fastener having complementary faced surfaces according to the invention;

FIG. 2 is a plan view of the fastener of FIG. 1 in a partially open position;

FIG. 3 is a section through a closed portion of the fastener of FIG. 1, taken substantially as indicated on line 3—3 of FIG. 2;

FIG. 4 is a side elevation of a closed portion of the fastener of FIG. 1;

FIG. 5 is a plan view of a second form of a fastener according to the invention, the fastener being shown in a partially open position;

FIG. 6 is a section through a closed portion of this form of fastener, taken substantially as indicated on line 6—6 of FIG. 5;

FIG. 7 is a side elevation of a closed portion of the fastener of FIG. 5;

FIG. 8 is an enlarged fragmentary perspective of a band of fastener material, according to FIG. 5, the face of which has a series of diagonally arranged tetrahedral projections;

FIG. 9 is a view, like FIG. 8, showing a band of fastener material, the face of which has a series of longitudinally arranged tetrahedral projections;

FIG. 10 is a plan view of a third form of a fastener according to the invention, the fastener being shown in a partially open position similar to FIGS. 2 and 5;

FIG. 11 is a section through a closed portion of this form of fastener, taken substantially as indicated on line 11—11 of FIG. 10; and FIG. 12 is a side elevation of the fastener of FIG. 10 in a partially open position.

A fastener according to the invention, indicated generally at 20 in FIGS. 1-4, at 30 in FIGS. 5-9, and at 40 in FIGS. 10-12, comprises two bands of a strip material having complementary faced surfaces which are magnetically attracted to each other. Each band of fastener strip material, indicated at 21, 31, and 41, in the respective sets of views, is attached by suitable means or techniques to surfaces that are adjacent to or brought into proximity with each other and are then required to be joined or sealed together.

By way of example, the adjacent surfaces (shown by chain lines in FIG. 1) could be the sides of a brief case like envelope, the lapels of a coat, the flaps of a tent, etc. The adjacent surfaces per se may lie parallel to each other or may intersect at any angle as desired, so long as the two bands of strip material comprising each fastener are brought into approximate alignment.

Referring to FIGS. 1–4, a fastener 20 has two bands or backing strips 21 which are preferably identical in shape and composition. The shape of a band 21 is generally rectangular and of any length desired for the particular fastening purpose involved. The bands 21 may be a web of fabric material, such as woven or knitted cotton sheeting, or a plastic sheet, such as film of polyvinyl chloride manufactured by calendering, casting, or extrusion. The band 21 may be flexible (as shown), semi-rigid, or even rigid, depending upon the particular fastening purpose involved.

On the inner or opposed faces of each fastener band 21 are a series of magnetic components 22. Each magnetic component 22 is a segment or block of a permanently magnetized material, such as a recently developed product of the B. F. Goodrich Co., Akron, Ohio, distributed under the name "Koroseal Flexible Magnetic Strip." Insofar as can be determined, this product is plasticized vinyl resin based material having magnetizable particles embedded therein. The product is extruded in strips of any desired length and cross sectional shape. The product is actually an electrical insulator but unlike iron-type magnets, it can be spot-magnetized or shape-magnetized for the most efficient use. For example, the material can have poles across the width of thickness, or along one face with the two poles along the edge, or along one face with alternating poles, or in long continuous lengths. For purposes of the present invention, the preferred arrangement is one where the North Pole runs continuously the length of the strip on one edge and the South Pole runs continuously on the opposite edge.

In the form of FIGS. 1–4, the magnetic segments 22 on the opposed faces of each band of backing strip 21 are preferably arranged in two rows. In each row, the segments 22 alternate with segments or blocks of an "armature" material 23. The "armatures" are a magnetically attracted material and, in this form, may be flat and thin steel or iron-containing plates. The alternating segments 22 and 23 in one row (indicated at I in FIG. 1) are staggered in a "zig-zag" manner with relation to the alternating segments 22 and 23 in the second row (indicated in II in FIG. 1). Also, when lengths of the fastener material are attached to the surfaces to be joined, one length of material is turned 180° so that a segment 22 on one band will be opposed to and will attract a segment 23 on the other band. This provides two bands of fastener material having complementary faced surfaces which are magnetically attracted to each.

The magnetic segments 22 may be attached to the face of a band 21 by any suitable means, as would be well known to those skilled in this art. By way of example, when the segments 22 are a plasticized vinyl resin based material, as described above, a vinylidene chloride copolymer base solvent released adhesive may be used for attachment of the segments to the face of a band 21. The magnetically attracted armature segments 23 may be attached to the band 21 by the same type of adhesive. If the fastener 20 is exposed to moisture, it is also desirable that the exposed surface of the segments 23 have a thin protective coating, such as a decorative oxide or a film of non-insulative plastic.

Referring to FIGS. 5–9, a fastener 30 has two bands or backing strips 31, similar in shape and composition to the bands 21 of a fastener 20. The magnetic components or segments 32 on the opposed faces of each band 31 are preferably of the same composition as the segments 22.

The segments 32 are in the form of adjoining or abutting tetrahedral or pyramidal projections. The series of segments 32 may be arranged in any suitable manner, such as the diagonal arrangement of FIG. 8 or the longitudinal arrangement of FIG. 9.

The size of the projection segments 32 is preferably such that the two strips of a fastener 30 may be cut from the same length of material. In theory, it is possible that the two thus identically faced surfaces would contact only at the apex of each projection 32 and thus the faced surfaces would not be attracted sufficiently to obtain a closing effect. However, in practice, if this condition of closing registry occurs, a very slight relative displacement of one band 31 in relation to the other band 31, will cause the segments 32 to substantially mesh, as seen in FIG. 6.

The segments 32 may be prepared individually or, as preferred, may be embossed onto wide strands of the magnetic material. In either event, the segments 32 are attached to the face of the bands 22 by any suitable means, such as the adhesive for segments 22 described above.

The segments 32 may be magnetized as desired, though magnetizing as the North Pole along one side of a row of projections 32 and as the South Pole along the opposite side of a row of projections is preferred. It will also be noted that the polarity of the fields of segments 32 will have an effect on the closing registry discussed above. That is, if extreme accuracy of closing registry is required, alternating North and South Poles along a side of a given row of projections will provide for greater precision of closing.

Referring to FIGS. 10–12, a fastener 40 has two bands or backing strips 41, similar in shape and composition to the bands 21 of a fastener 20. The magnetic components or segments 42 on the opposed faces of each band 41 are preferably of the same composition as the segments 22.

The segments 42 are in the form of a series of channels or raised ribs. It is preferred that the rib segments 42 extend longitudinally of each band 41, though, they could be arranged in a transverse or a herring bone like pattern, if desired.

The segment 42 may be prepared individually or, as preferred, may be embossed onto wide strands of the magnetic material. In either event, the segments 42 are attached to the face of the bands by any suitable means, such as the adhesive for segments 22, described above.

The segments 42 may be magnetized as desired, though magnetizing as the North Pole along one side of a rib 32 and as the South Pole along the opposite side of a row of projections is preferred.

While several embodiments of the concepts of the invention have been disclosed and suggested to those skilled in the art, it will be apparent that further modifications of the invention could be made within the scope thereof. Therefore, it is intended that the scope of the invention be defined only by the scope of the appended claims.

What is claimed is:

1. A separable strip fastener comprising a pair of strips of longitudinally flexible magnetic material which strips have complementary projections and recesses of such shape in lateral cross section as to permit direct apposition and separation of the strips in a direction perpendicular to the general plane of the fastener strips and to resist relative lateral motion of the strips when they are intermeshed, at least one strip having its individual projections provided with generally oppositely directed lateral faces engaging corresponding faces of the recesses of the other strip and magnetized with an N pole on one lateral face and an S pole on the opposite lateral face of the same projection.

2. A separable strip fastener comprising a pair of strips of longitudinally flexible magnetic material of the same shape, which strips have complementary projections and recesses of limited extent in every direction and with sloping faces to permit direct apposition and separation of the strips in a direction perpendicular to the general plane of the fastener strips and to resist relative lateral and longitudinal motion of the strips when they are intermeshed, both strips having their individual projections provided with generally oppositely directed lateral faces engaging corresponding faces of the recesses of the other strip and magnetized with an N pole on one lateral face and an S pole on the opposite lateral face of the same projection.

3. A fastener according to claim 1 in which the two strips are of the same shape and are both magnetized.

4. A fastener according to claim 1 in which the projections and recesses are shaped to restrain relative motion both laterally and longitudinally when the strips are intermeshed.

References Cited in the file of this patent

UNITED STATES PATENTS

| | | |
|---|---|---|
| 2,389,298 | Ellis | Nov. 20, 1945 |
| 2,461,201 | Ellis | Feb. 8, 1949 |
| 2,615,227 | Hornik | Oct. 28, 1952 |
| 2,627,097 | Ellis | Feb. 3, 1953 |
| 2,959,832 | Baermann | Nov. 15, 1960 |